United States Patent
Golan et al.

(10) Patent No.: US 12,250,615 B2
(45) Date of Patent: Mar. 11, 2025

(54) SYSTEMS AND METHODS FOR MANAGING GROUP COMMUNICATIONS OVER A COMMUNICATIONS NETWORK

(71) Applicant: Meep—Advanced Enterprise Communication Ltd, Netanya (IL)

(72) Inventors: Yossef Golan, Netanya (IL); Haim Teichholtz, Netanya (IL)

(73) Assignee: MEEP—ADVANCED ENTERPRISE COMMUNICATION LTD., Netanya (IL)

( * ) Notice: Subject to any disclaimer, the term of this patent is extended or adjusted under 35 U.S.C. 154(b) by 0 days.

(21) Appl. No.: 18/358,954

(22) Filed: Jul. 26, 2023

(65) Prior Publication Data
US 2023/0370817 A1   Nov. 16, 2023

Related U.S. Application Data

(63) Continuation of application No. PCT/IL2021/051528, filed on Dec. 23, 2021.

(30) Foreign Application Priority Data

Jan. 26, 2021   (IL) .......................................... 280434

(51) Int. Cl.
*H04W 4/08* (2009.01)
*H04W 4/02* (2018.01)
*H04W 4/10* (2009.01)

(52) U.S. Cl.
CPC ............. *H04W 4/08* (2013.01); *H04W 4/027* (2013.01); *H04W 4/10* (2013.01)

(58) Field of Classification Search
CPC .......... H04W 4/08; H04W 4/027; H04W 4/10
See application file for complete search history.

(56) References Cited

U.S. PATENT DOCUMENTS 6,477,387 B1 * 11/2002 Jackson ................ H04W 84/08
                                                              455/518
8,532,585 B2    9/2013 Deleus et al.
(Continued)

FOREIGN PATENT DOCUMENTS

KR          101947012 B1      2/2019

OTHER PUBLICATIONS

New PTT Group management in web admin; May 18, 2018; Taken from: https://www.grouptalk.com/news/ on May 12, 2019.

(Continued)

*Primary Examiner* — Raymond S Dean
(74) *Attorney, Agent, or Firm* — S.J. Intellectual Property Ltd.

(57) ABSTRACT

A communications system and method for managing a transmission of a given communication by a given communication device to one or more group members of one or more groups over a communications network is provided. The communications system comprises processing circuitry configured to: obtain event information regarding one or more events that are captured at the given communication device, the events not including activation of the given communication device by the user of the given communication device to transmit the given communication; and perform one or more actions based on the event information, automatically and without involvement of the user of the given communication device, in response to the user activating the given communication device to transmit the given communication.

19 Claims, 5 Drawing Sheets

(56) References Cited

U.S. PATENT DOCUMENTS

| | | | |
|---|---|---|---|
| 10,743,170 | B1 | 8/2020 | Glick et al. |
| 11,501,618 | B1* | 11/2022 | Siminoff ................ H04N 23/56 |
| 2006/0040689 | A1* | 2/2006 | Yoon ........................ H04W 4/10 |
| | | | 455/518 |
| 2007/0002779 | A1* | 1/2007 | Lee ........................ H04W 76/45 |
| | | | 370/260 |
| 2007/0026883 | A1 | 2/2007 | Sung et al. |
| 2008/0004059 | A1 | 1/2008 | Feng |
| 2009/0098898 | A1* | 4/2009 | Patterson .............. H04L 1/0019 |
| | | | 455/521 |
| 2009/0291646 | A1 | 11/2009 | Ong et al. |
| 2010/0159976 | A1 | 6/2010 | Marocchi et al. |
| 2013/0204998 | A1* | 8/2013 | Russell ................ G06Q 30/00 |
| | | | 709/223 |
| 2014/0204824 | A1* | 7/2014 | Chen ........................ H04W 4/08 |
| | | | 370/312 |
| 2016/0010577 | A1 | 4/2016 | Wawrowski et al. |
| 2016/0105773 | A1 | 4/2016 | Wawrowski et al. |
| 2017/0265045 | A1 | 9/2017 | Igumnov et al. |
| 2017/0279952 | A1* | 9/2017 | Ando ................ H04M 1/72448 |
| 2017/0311256 | A1 | 10/2017 | Patel et al. |
| 2018/0020336 | A1* | 1/2018 | Gupta ................ H04L 65/1083 |
| 2018/0160278 | A1 | 6/2018 | Patel et al. |
| 2018/0295478 | A1 | 10/2018 | Bohlander et al. |
| 2018/0302948 | A1 | 10/2018 | Kotlyarov |

OTHER PUBLICATIONS

Android P to Predict User Behavior With Suggested App Actions—Google I/O 2018; Taken from: https://www.androidheadlines.com/2018/05/android-p-to-predict-user-behavior-with-suggested-app-actions-google-i-o-2018.html on May 12, 2019.

Predicting the Next App That You Are Going to Use; * Specifically look at: Section 4—App Usage Prediction on pp. 4-7; See discussions, stats, and author profiles for this publication at: https://www.researchgate.net/publication/281605271; All content following this page was uploaded by Di Jiang on Aug. 17, 2017.

O4. Nasim, M., Rextin, A., Khan, N. and Malik, M.M., 2015—On Temporal Regularity in Social Interactions: Predicting Mobile Phone Calls. arXiv preprint arXiv: 1512.08061; * Specifically look at: Section IV—Methodology on pp. 3-4.

1. Kang, S., Won, H., Jeon, G. and Lee, Y.S., 2012, August—Call prediction model based on smartphone users behavior. In International Conference on Hybrid Information Technology (pp. 180-185). Springer, Berlin, Heidelberg; *Specifically look at: Section 3—The Calling Prediction Model on p. 183.

* cited by examiner

SYSTEMS AND METHODS FOR MANAGING GROUP COMMUNICATIONS OVER A COMMUNICATIONS NETWORK

CROSS-REFERENCE TO RELATED APPLICATION

This application is a Continuation of International Patent Application No. PCT/IL2021/051528, filed Dec. 23, 2021, which is incorporated by reference herein in its entirety.

TECHNICAL FIELD

The invention relates to systems and methods for managing group communications over a communications network.

BACKGROUND

Communication devices (e.g., User Equipment (UE) endpoints) can be configured to transmit and receive wireless communications on communication lines over a communications network. Such communication devices can be used by group members in a collaboration group to communicate with one another. Currently, for a group member in a given collaboration group to transmit a communication to other group members in the given collaboration group, the group member must select the given collaboration group from a list of collaboration groups that are displayed on the group member's communication device. After selecting the given collaboration group, the group member must activate his/her communication device to transmit the given communication. A server that is capable of communicating with the communication devices over the communications network is configured to perform processing operations, in response to the group member activating his/her communication device. Only after the server completes performing the processing operations can the group member begin transmitting the communication to the other group members in the given collaboration group.

It is an object of the present disclosure to manage group communications over a communications network, including reducing an amount of time that is required for a user of a given communication device who is a group member of a given collaboration group to transmit a communication to other group members of the given collaboration group. This need is particularly acute in the event that the communication is highly urgent.

References considered to be relevant as background to the presently disclosed subject matter are listed below. Acknowledgement of the references herein is not to be inferred as meaning that these are in any way relevant to the patentability of the presently disclosed subject matter.

Kang et al., "Call Prediction Model Based on Smartphone Users Behavior", International Conference on Hybrid Information Technology, August 2012 (pp. 180-185) proposes a model for the prediction of the next behavior based on the smartphone call record of a user. The data of calls includes a lot of information in addition to time point and talk time. This information is systematically classified and a complex model to predict the next behavior of a user is suggested. The call data has a significant meaning by its nature in the frequency analysis, trend analysis, and pattern analysis, and the data is specifically classified into the 30 items and applied to the analysis.

Baeza-Yates et al., "Predicting the Next App that you are Going to Use", Proceedings of the Eighth ACM International Conference on Web Search and Data Mining, February 2015 (pp. 285-294) discloses how to improve home screen apps' usage experience through a prediction mechanism that allows showing to a user which app she is going to use in the immediate future. The prediction technique is based on a set of features representing the real time spatiotemporal contexts sensed by the home screen app. The prediction of the next app is modeled as a classification problem and an effective personalized method to solve it that takes full advantage of human-engineered features and automatically derived features is proposed. Furthermore, a study of how to solve the two naturally associated cold-start problems, namely app cold-start and user cold-start, is performed.

Android P to Predict User Behavior with Suggested App Actions—Google I/O 2018, retrieved at https://www.androidheadlines.com/2018/05/android-p-to-predict-user-behavior-with-suggested-app-actions-google-i-o-2018.html on May 12, 2019, discloses that Google's Android P will be capable of predicting user behavior and making one's smartphone usage more efficient through recommendations called App Actions. The feature works as an extension of the Google Launcher, Google Assistant, and Google Search, all of which will be able to deliver such suggestions starting with Android P.

Nasim et al., "Predicting Mobile Phone Calls", Temporal Regularity in Social Interactions, 2015, predicts outgoing mobile phone calls using a machine learning approach. An analysis to which extent the activity of mobile phone users is predictable is performed. The premise is that mobile phone user's exhibit temporal regularity in their interactions with a majority of their contacts. In the sociological context, most social interactions have fairly reliable temporal regularity. By quantifying the extension of this behavior to interactions on mobile phones, it can be expected that caller-callee interaction is not merely a result of randomness, rather it exhibits a temporal pattern. To this end, this approach is tested on an anonymized mobile phone usage dataset collected specifically for analyzing temporal patterns in mobile phone communication. The results show that users' historic calling patterns can predict future calls with reasonable accuracy.

U.S. Patent Application Publication No. 2017/0311256, published on Oct. 26, 2017, provides a system and method for push-to-talk (PTT) key one-touch calling. In an embodiment, a client device accesses a discontinuous reception (DRX) mode policy. The DRX mode policy is in accordance with push-to-talk (PTT) usage patterns of at least the client device. The client device selects a DRX cycle time based on the DRX mode policy. The client device applies the DRX cycle time to a cellular network interface of the client device.

"New PTT Group Management in Web Admin", retrieved at: https://www.grouptalk.com/news/on May 12, 2019, discloses that the GroupTalk PTT service has been updated with new "PTT Group management" settings in the web admin. This allows an organization to centrally manage which PTT Groups a user shall automatically join when going on-line in the GroupTalk app on Android or iOS. Settings for "Select PTT Group" Manually: the user will manually select which PTT group to join when a user goes on-line. Automatically: the user will automatically join the specified PTT group when the user goes on-line, but can afterwards manually select to join another PTT group. Always: the user will automatically be forced to join the specified PTT group and can never leave it, when the user goes on-line. Never: the user does not have access to the PTT Group.

U.S. Patent Application Publication No. 2007/0026883, published on Feb. 1, 2007, provides a system and method for re-invitation to a PoC group session. Processes of determining non-participating group members when the group session is initiated, obtaining information about the non-participating group members, and re-inviting the non-participating group members to a corresponding ongoing group session, are performed for all non-participating group members at one time.

U.S. Patent Application Publication No. 2009/0291646, published on Nov. 26, 2009, presents a communication device and method. The device is in a network of devices of different groups. The device contains a push-to-talk (PTT) button, a channel selector, and a keyboard containing hard or soft keys. The channel selector selects an initial frequency at which to receive and transmit, dependent on the group to which the device belongs. The device transmits when the PTT button is pressed. If a multiple PTT function is activated by software in the device, at least some of the keys are used to select a new transmission frequency. The device receives at the initial frequency independent of the transmission frequency. The multiple PTT function can be activated by a dedicated soft or hard key or a key on the keyboard that serves multiple functions. The frequency selection provided by the keys is dependent on the channel and the device group.

U.S. Pat. No. 8,532,585, published on Sep. 10, 2013, provides control of multiple functions of an electronic device by using a single control element including a switch body adjustable between multiple switch positions, a primary actuator with lateral and distal surface portions extending from the switch body and configured for adjusting the switch body between the switch positions, and a pressure sensor operable via an activation force at the lateral surfaces of the primary actuator. A first function can be controlled responsive to motion of the primary actuator during an activation of the pressure sensor. Additionally, a second function can be controlled responsive to the motion of the primary actuator of the control element exclusive of the activation of the pressure sensor. Further, a third function can be controlled in responsive to activation of the pressure sensor for at least a first period of time exclusive of motion of the primary actuator.

U.S. Patent Application Publication No. 2018/0302948, published on Oct. 18, 2018, discloses a push-to-talk (PTT)-enabled communication device with an interface for selecting a talkgroup and initiating a PTT communication with the talkgroup. The interface includes a component configured to (1) select the talkgroup in response to the component receiving a first input that causes a rotation of the component, and (2) initiate the PTT communication with the talkgroup in response to the component receiving a second input that is different from the first input. In one example, the interface may comprise a physical PTT button that is rotatable. In another example, the interface may comprise an apparatus with a graphical user interface (GUI) including a PTT-button area that visually rotates.

Korean Patent No. 101947012, published on Feb. 12, 2019, discloses group communications for an employee management system.

U.S. Patent Application Publication No. 2008/0004059, published on Jan. 3, 2008, discloses a system, method and computer application for communication in a push to talk (PTT) and/or push to talk over cellular (PoC) that enables users to access additional services. The method generally includes requesting information (e.g., location information) associated with at least one portable communication device of a group of portable communication devices, receiving the information and requesting additional services from a remote application server based on the received location information, and displaying the output of the service information in a user sensible format on a display associated with at least one of the portable communication devices.

U.S. Pat. No. 7,529,558, published on May 5, 2009, provides a system and method for establishing location-based push-to-talk communication groups. A location determining application is incorporated within a communication network for members of a push-to-talk group. This application may include global positioning satellite technology incorporated in mobile communication devices carried by the members, a triangulation application incorporated at a communications server, or an RFID application associated with the members. Location data obtained on the members is maintained in a database that is accessible to a communications server facilitating communication between the members. When a member initiates a push-to-talk communication, other members of the group are contacted based upon their locations. The communication can be selectively transmitted to either those within a pre-designated location, or outside of the pre-designated location.

U.S. Patent Application Publication No. 2006/0116149, published on Jun. 1, 2006, provides a system and method for efficient push-to-talk (PTT) communications in a cellular network of wireless telephones. The method comprises the steps of: receiving a PTT session initiation in a cellular wireless telephone network; identifying a plurality of common PTT session mobile stations in close proximity as a group; assigning a shared forward link channel to the group; and transmitting a PTT statement on the shared channel via the forward link. The shared channel can be a shared traffic channel or a common channel, such as a broadcast channel, forward common control channel, or paging channel. The shared forward link channel may be in either a circuit-switched or IP packet data system. Further, the shared forward link channel, in addition to including a shared forward fundamental channel, may also include a shared forward supplemental channel.

U.S. Patent Application Publication No. 2011/0294494, published on Dec. 1, 2011, discloses a predictive wakeup function for Push-to-Talk-over Cellular (PoC) call setup optimizations in a cellular mobile phone network. In performing the predictive wakeup for call setup optimizations, an originating mobile transmits an event trigger to a real-time exchange that interfaces to a mobile switching center in the cellular mobile phone network. The real-time exchange transmits a wakeup message to one or more terminating mobiles of predicted participants, in order to transition the terminating mobiles of the predicted participants from a dormant state to an active state prior to a call being setup with the terminating mobiles of the predicted participants. The terminating mobiles of the predicted participants are identified by a predictive wakeup mechanism before the originating mobile sends a list of one or more terminating mobiles of actual participants to the real-time exchange. The predicted participants may be determined based on static or dynamic information, including heuristics involving calling patterns.

International Patent Application Publication No. 2004/062306, published on Jul. 22, 2004, discloses a proactive speculation method that decreases the call setup time for private calls and selective dynamic group calls. In a pushto-talk dispatch network an originating mobile unit sends a wake-up packet to the dispatch network. Prior to initiating the push-to-talk function, the target mobile units receive a wake-up packet from network. Thereby, prior to establishing the push-to-talk function, each of the mobile units in the push-to-talk call have been coupled via RF links. If the originating mobile unit has a current IP address, direct wake-up packets may be sent.

U.S. Patent Application Publication No. 2016/0205519, published on Jul. 14, 2016, discloses an embodiment method that includes receiving, by a first push-to-talk (PTT) service hosted on a processor, a session initiation request from a PTT client of a user and identifying, by the first PTT service, a user affinity group of the user. The user is assigned to the user affinity group in accordance with a prediction the user will communicate with first users in the user affinity group more frequently than second users in different user affinity groups. The method further includes determining, by the first PTT service, a PTT call server for the user affinity group. The PTT call server serves the user and the first users belonging to the user affinity group.

U.S. Patent Application Publication No. 2003/0017836, published on Jan. 23, 2003, discloses retrieving Information from a list of members of a group call group. Based on the retrieved information, a group call is established between first and second mobile stations (MS). The first MS is served by a first base station controller (BSC) and the second MS is served by a second BSC. Voice data for the group call is transmitted in a multicast session. Based on a history of group calls between two points in a mobile communications network, a determination is made as to whether to establish a multicast session between the two points, e.g., in anticipation of a future group call.

U.S. Patent Application Publication No. 2018/0288144, published on Oct. 4, 2018, describes a variety of approaches to provide an automatic group creation based on an organization hierarchy. A hosted service initiates operation(s) to automatically create a group upon detecting a new organization hierarchy or a utilization of a feature of a hosted service by an existing organization hierarchy. Next, group members are determined based on the organization hierarchy. The group is created that includes the group members to coordinate services within the hosted service based on the organization hierarchy. Furthermore, an attribute of the created group is defined. A resource is also generated for the created group. The resource includes a notebook, a work space, a collaboration site, and/or a planner. The created group is deployed to coordinate the services. The resource is managed through the services.

U.S. Pat. No. 7,873,378, published on Jan. 18, 2011, relates to a method of reducing setup delay for an uplink message from a user terminal (UT) in a delay sensitive service in a radio telecommunications system, such as a push to talk service (PoC), by predicting that delay sensitive data is about to be transmitted; sending, as a response to the prediction, a connection setup signal from the terminal to a base station subsystem (BSS) in order to set up an early uplink radio connection; and transmitting the delay sensitive data via the early uplink connection. There is also provided a user terminal (UT) and a radio telecommunications system.

International Patent Application Publication No. 2017/212124, published on Dec. 14, 2017, discloses a system and method for push-to-talk type voice communication between a plurality of users of a telecommunications network. This method for push-to-talk type voice communication between a plurality of users of a telecommunications network comprises the following steps: a step of determining a group of users as a function of parameters of each user, such as the selection of a broadcast channel, the range and the geographical coordinates of each user; a step, which is performed by a message priority management module, of allowing a priority level to be computed for the voice messages exchanged during the session as a function of the broadcast channel, the members of the group, the number of users, the statistics for the last exchanges and the geolocation relative to the transmitter of the message; and a step of live or delayed broadcasting, by a broadcast module, of the voice message as a function of the priority level computed for this voice message.

U.S. Patent Application Publication No. 2016/0044064, published on Feb. 11, 2016, discloses a method for initializing a call for a mobile terminal including PTT applications on an IP-WAN cellular network, the method including, for each user of the mobile terminal connected to an IP-WAN modem intended to register for a group call: upon starting up the IP-WAN modem, connecting the mobile terminal to the IP-WAN cellular network; when a PTT client is active and has obtained an IP address of a PTT server, initiating by the PTT client a procedure for registering a SIP with the PTT server on a default IP-WAN carrier; performing by the PTT client a procedure for affiliation to a call group with the PTT server on the default IP-WAN carrier, and as soon as the procedure for affiliation to the call group is performed, executing an "INVITE" (SIP) procedure to RTP resources at an application level on a PTT side and on the PTT client side, to allow the establishment of the RTP session after the affiliation of the PTT client to the group.

U.S. Pat. No. 8,249,078, published on Aug. 21, 2012, discloses a method and system to help reduce the impact of inter-node latency in session setup. In accordance with the method, a computer will predict a measure of call setup signaling latency for each of a number of wireless communication devices based on actual latency data for the coverage areas in which the devices are positioned, and the computer will then use the predicted latency measures as a basis to select one or more of the devices to wake up in advance of session initiation. The computer will then send at least one message that triggers wakeup of the selected device(s), so as to help reduce latency in subsequent initiation of a session with the selected device(s). Further, the computer may provide notification to a given device of the predicted latencies determined for other devices, to facilitate presentation of the latency information to a user.

General Description

In accordance with a first aspect of the presently disclosed subject matter, there is provided a communications system for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the communications system comprising processing circuitry configured to: obtain event information regarding one or more events that are captured at the given communication device, the events not including activation of the given communication device by the user of the given communication device to transmit the given communication; and perform one or more actions based on the event information, automatically and without involvement of the user of the given communication device, in response to the user activating the given communication device to transmit the given communication.

In some cases, the actions include one or more of the following: (a) selecting the groups; or (b) bursting into at least one of the groups.

In some cases, the given communication device and the other communication devices are User Equipment (UE) endpoints.

In some cases, the groups are Push to Talk (PTT) groups, and the user of the given communication device activates the given communication device by activating a PTT button that is situated on or otherwise associated with the given communication device.

In some cases, the events that are captured at the given communication device include one or more of the following: (a) one or more predetermined sounds, (b) audible content having a first decibel level greater than a predefined second decibel level; (c) a predetermined word or combination of words; or (d) human or other speech uttered at a first rate that is higher than a predefined second rate.

In some cases, the given communication is a video communication, a voice communication, or a text communication.

In some cases, the processing circuitry is further configured to obtain additional information, different than the event information, and wherein at least one of the actions is performed also based on the additional information.

In some cases, the additional information is obtained from one or more external sources.

In some cases, the given communication device and the other communication devices are used by organizational members of at least one organization, and the additional information includes one or more of: (a) records associated with personnel in the at least one organization, or (b) data regarding policies or rules of the at least one organization.

In some cases, the additional information is a reading of a speed at which the given communication device is displaced prior or concurrently to the activation of the given communication device to transmit the given communication.

In some cases, the additional information is a location of the given communication device.

In some cases, the additional information is historical data of one or more previous communications transmitted or received by the given communication device.

In accordance with a second aspect of the presently disclosed subject matter, there is provided a communications system for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the communications system comprising processing circuitry configured to: obtain event information regarding one or more events that are associated with the given communication device, the events not including activation of the given communication device by the user of the given communication device to transmit the given communication; predict, based on the event information, that the given communication device is expected to transmit the given communication to the one or more group members of the one or more groups; and upon performing the predict, automatically initiate the groups, thereby enabling an immediate transmission of the given communication to the group members of the groups upon the user of the given communication device activating the given communication device to transmit the given communication.

In some cases, the given communication device and the other communication devices are User Equipment (UE) endpoints.

In some cases, the groups are Push to Talk (PTT) groups, and the user of the given communication device activates the given communication device by activating a PTT button that is situated on or otherwise associated with the given communication device.

In some cases, the events that are associated with the given communication device include one or more of the following: (a) a start of a work shift for the user of the given communication device, wherein the users of the other communication devices work the work shift, (b) one or more predetermined sounds that are captured at the given communication device, (c) audible content that is captured at the given communication device and having a first decibel level greater than a predefined second decibel level; (d) a predetermined word or combination of words that is captured at the given communication device; or (e) human or other speech that is captured at the given communication device and uttered at a first rate that is higher than a predefined second rate.

In some cases, the given communication is a video communication, a voice communication, or a text communication.

In some cases, the processing circuitry is further configured to obtain additional information, different than the event information, and the predict is also based on the additional information.

In some cases, the additional information is obtained from one or more external sources.

In some cases, the given communication device and the other communication devices are used by organizational members of at least one organization, and the additional information includes one or more of: (a) records associated with personnel in the at least one organization, the records not including work shift information regarding the personnel, or (b) data regarding policies or rules of the at least one organization.

In some cases, the additional information is a location of the given communication device.

In some cases, the additional information is historical data of one or more previous communications transmitted or received by the given communication device.

In accordance with a third aspect of the presently disclosed subject matter, there is provided a method for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the method comprising: obtaining event information regarding one or more events that are captured at the given communication device, the events not including activation of the given communication device by the user of the given communication device to transmit the given communication; and performing one or more actions based on the event information, automatically and without involvement of the user of the given communication device, in response to the user activating the given communication device to transmit the given communication.

In some cases, the actions include one or more of the following: (a) selecting the groups; or (b) bursting into at least one of the groups.

In some cases, the given communication device and the other communication devices are User Equipment (UE) endpoints.

In some cases, the groups are Push to Talk (PTT) groups, and the user of the given communication device activates the given communication device by activating a PTT button that is situated on or otherwise associated with the given communication device.

In some cases, the events that are captured at the given communication device include one or more of the following: (a) one or more predetermined sounds, (b) audible content having a first decibel level greater than a predefined second decibel level; (c) a predetermined word or combination of words; or (d) human or other speech uttered at a first rate that is higher than a predefined second rate.

In some cases, the given communication is a video communication, a voice communication, or a text communication.

In some cases, the method further comprises: obtaining additional information, different than the event information, wherein at least one of the actions is performed also based on the additional information.

In some cases, the additional information is obtained from one or more external sources.

In some cases, the given communication device and the other communication devices are used by organizational members of at least one organization, and the additional information includes one or more of: (a) records associated with personnel in the at least one organization, or (b) data regarding policies or rules of the at least one organization.

In some cases, the additional information is a reading of a speed at which the given communication device is displaced prior or concurrently to the activation of the given communication device to transmit the given communication.

In some cases, the additional information is a location of the given communication device.

In some cases, the additional information is historical data of one or more previous communications transmitted or received by the given communication device.

In accordance with a fourth aspect of the presently disclosed subject matter, there is provided a method for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the method comprising: obtaining event information regarding one or more events that are associated with the given communication device, the events not including activation of the given communication device by the user of the given communication device to transmit the given communication; predicting, based on the event information, that the given communication device is expected to transmit the given communication to the one or more group members of the one or more groups; and upon performing the predicting, automatically initiating the groups, thereby enabling an immediate transmission of the given communication to the group members of the groups upon the user of the given communication device activating the given communication device to transmit the given communication.

In some cases, the given communication device and the other communication devices are User Equipment (UE) endpoints.

In some cases, the groups are Push to Talk (PTT) groups, and the user of the given communication device activates the given communication device by activating a PTT button that is situated on or otherwise associated with the given communication device.

In some cases, the events that are associated with the given communication device include one or more of the following: (a) a start of a work shift for the user of the given communication device, wherein the users of the other communication devices work the work shift, (b) one or more predetermined sounds that are captured at the given communication device, (c) audible content that is captured at the given communication device and having a first decibel level greater than a predefined second decibel level; (d) a predetermined word or combination of words that is captured at the given communication device; or (e) human or other speech that is captured at the given communication device and uttered at a first rate that is higher than a predefined second rate.

In some cases, the given communication is a video communication, a voice communication, or a text communication.

In some cases, the method further comprises: obtaining additional information, different than the event information, wherein the predicting is also based on the additional information.

In some cases, the additional information is obtained from one or more external sources.

In some cases, the given communication device and the other communication devices are used by organizational members of at least one organization, and the additional information includes one or more of: (a) records associated with personnel in the at least one organization, the records not including work shift information regarding the personnel, or (b) data regarding policies or rules of the at least one organization.

In some cases, the additional information is a location of the given communication device.

In some cases, the additional information is historical data of one or more previous communications transmitted or received by the given communication device.

In accordance with a fifth aspect of the presently disclosed subject matter, there is provided a non-transitory computer readable storage medium having computer readable program code embodied therewith, the computer readable program code, executable by a processing circuitry of a computer to perform a method for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the method comprising: obtaining event information regarding one or more events that are captured at the given communication device, the events not including activation of the given communication device by the user of the given communication device to transmit the given communication; and performing one or more actions based on the event information, automatically and without involvement of the user of the given communication device, in response to the user activating the given communication device to transmit the given communication.

In accordance with a sixth aspect of the presently disclosed subject matter, there is provided a non-transitory computer readable storage medium having computer readable program code embodied therewith, the computer readable program code, executable by a processing circuitry of a computer to perform a method for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the method comprising: obtaining event information regarding one or more events that are associated with the given communication device, the events not including activation of the given communication device by the user of the given communication device to transmit the given communication; predicting, based on the event information, that the given communication device is expected to transmit the given communication to the one or more group members of the one or more groups; and upon performing the predicting, automatically initiating the groups, thereby enabling an immediate transmission of the given communication to the group members of the groups upon the user of the given communication device activating the given communication device to transmit the given communication.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
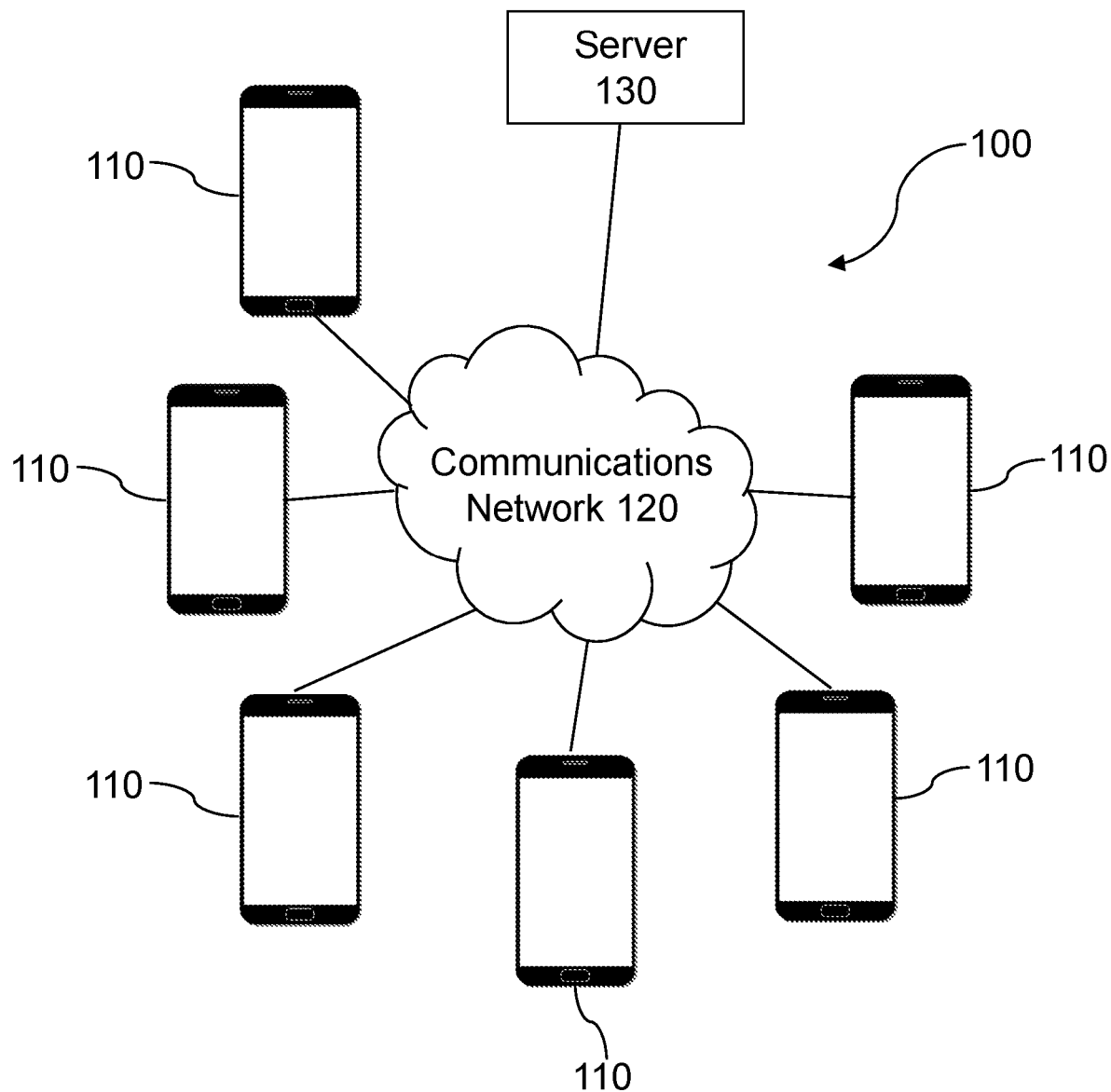
FIG. 1 is a schematic illustration of one example of a communications system for group communications between communication devices over a communications network, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "performing", "selecting", "bursting", "activating", "predicting", "initiating" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
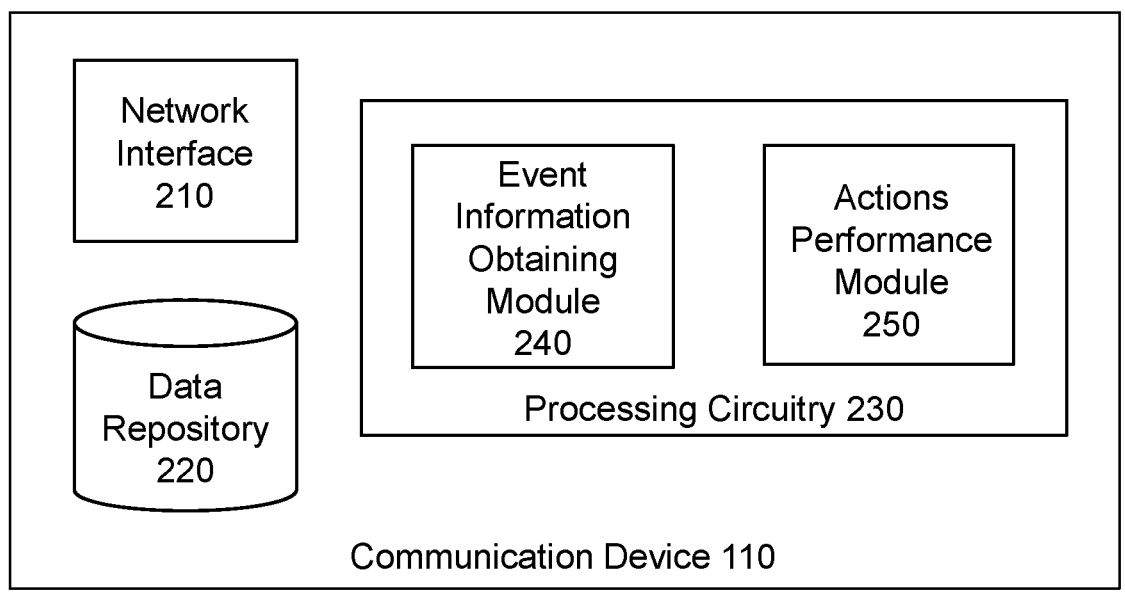
FIG. 2 is a block diagram schematically illustrating one example of a communication device in a communications system, in accordance with the presently disclosed subject matter.
Figure 3:
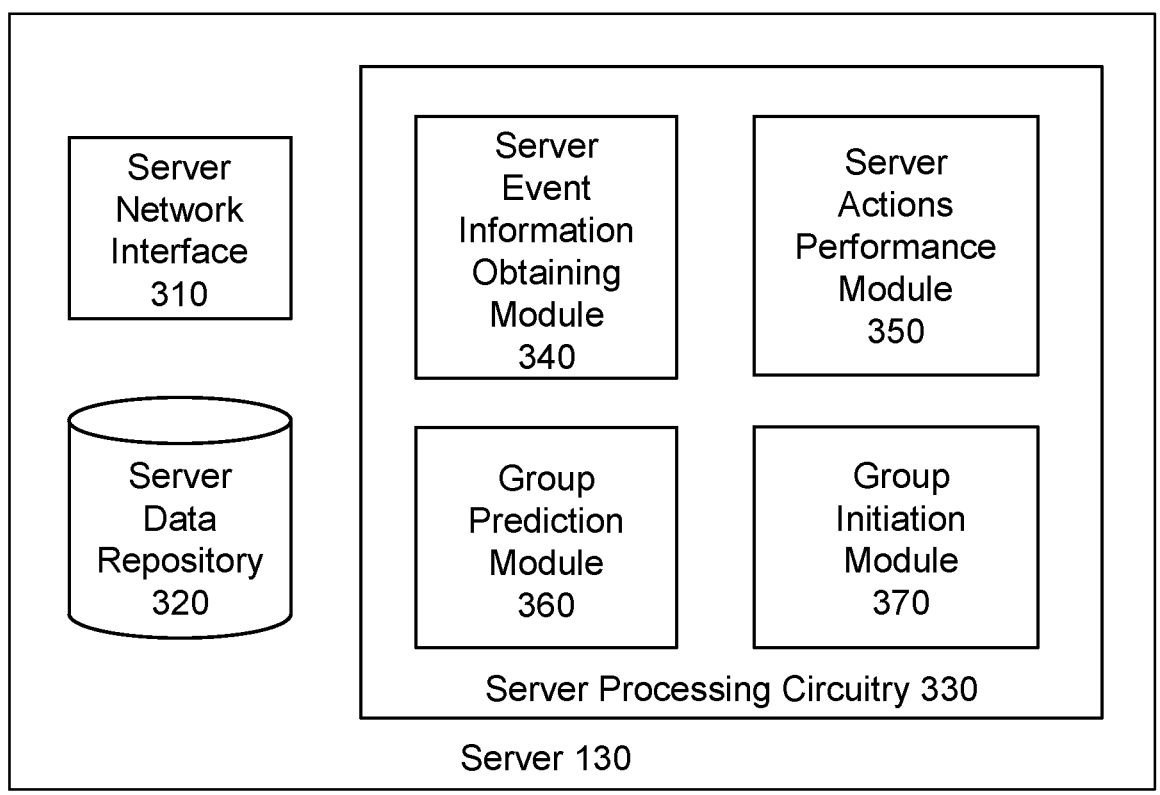
FIG. 3 is a block diagram schematically illustrating one example of a server in a communications system, in accordance with the presently disclosed subject matter.
Figure 4:
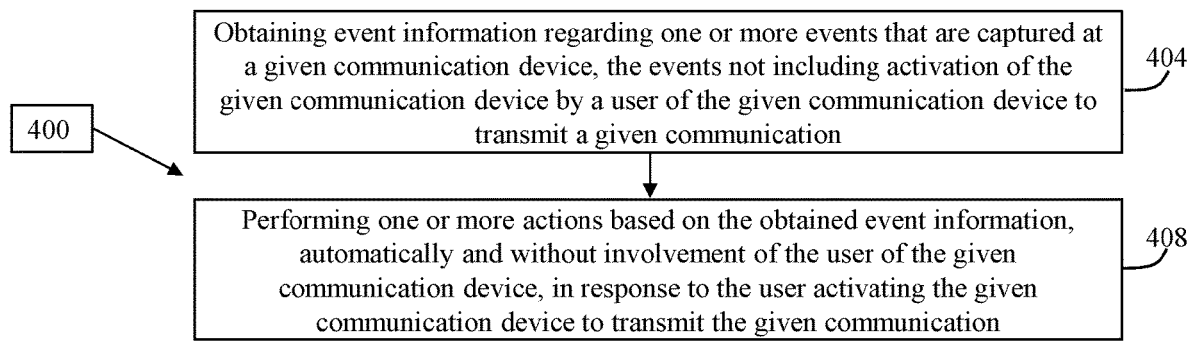
FIG. 4 is a flowchart illustrating one example of a sequence of operations performed by a given communication device in a communications system for facilitating a transmission of a given communication by the given communication device, in accordance with the presently disclosed subject matter.
Figure 5:
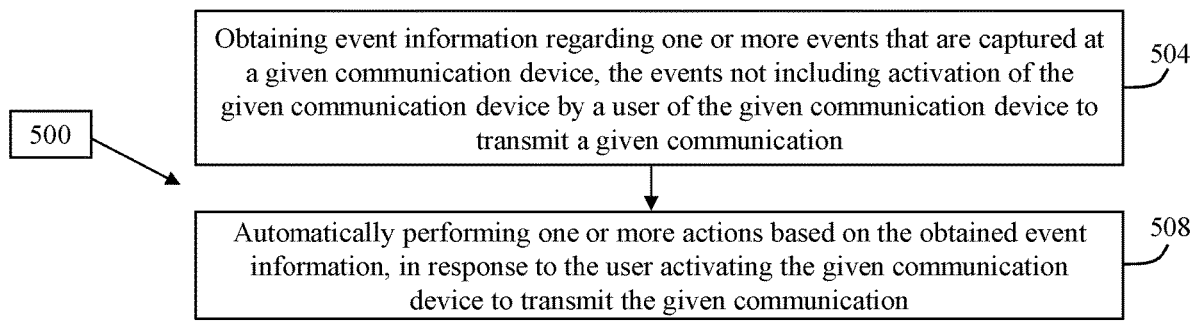
FIG. 5 is a flowchart illustrating one example of a sequence of operations performed by a server in a communications system for facilitating a transmission of a given communication by a given communication device in the communications system, in accordance with the presently disclosed subject matter.
Figure 6:
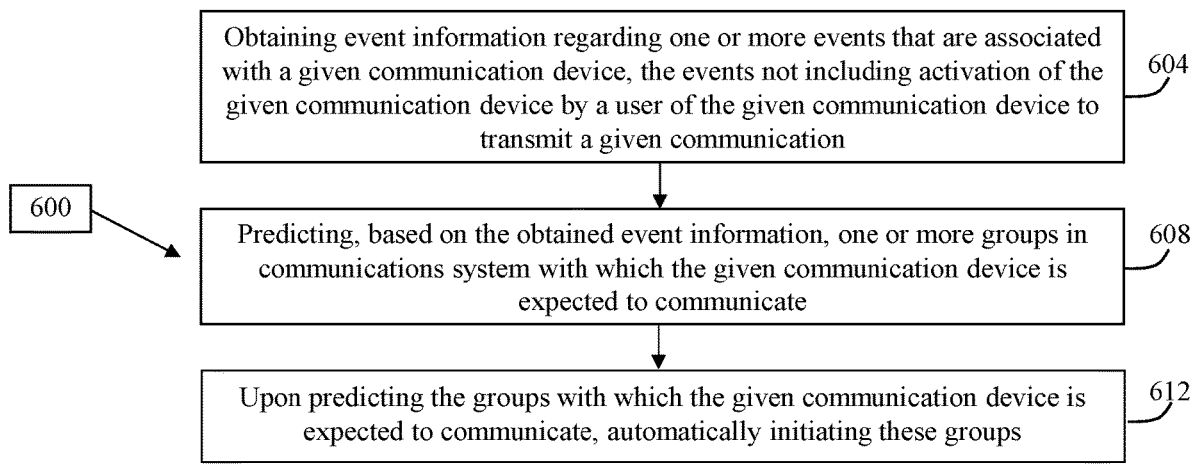
FIG. 6 is a flowchart illustrating one example of a sequence of operations performed by a server in a communications system for managing group communications by a given communication device in the communications system, in accordance with the presently disclosed subject matter.

In embodiments of the presently disclosed subject matter, fewer, more and/or different stages than those shown in FIGS. 4 to 6 may be executed. FIGS. 1 to 3 illustrate a general schematic of the system architecture in accordance with an embodiment of the presently disclosed subject matter. Each module in FIGS. 2 and 3 can be made up of any combination of software, hardware and/or firmware that performs the functions as defined and explained herein. The modules in FIGS. 2 and 3 may be centralized in one location or dispersed over more than one location. In other embodiments of the presently disclosed subject matter, the system may comprise fewer, more, and/or different modules than those shown in FIGS. 2 and 3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this is mind, attention is now drawn to FIG. 1, a schematic illustration of one example of a communications system 100 for group communications between communication devices 110 over a communications network 120, in accordance with the presently disclosed subject matter.

In accordance with the presently disclosed subject matter, communications system 100 includes communications network 120. In some cases, communications network 120 can be a mobile communications network. In some cases, the mobile communications network can be a cellular communications network. In some cases, the mobile communications network can be a radio communications network.

Communications system 100 further includes communication devices 110 that are connected to the communications network 120. Each communication device 110 is capable of transmitting and receiving communications on a communications line over the communications network 120. A communication that is transmitted by a given communication device 110 can be, for example, a video communication, a voice communication, or a text communication.

In some cases, as illustrated in FIG. 1, the communication devices 110 can be User Equipment (UE) endpoints 110. In some cases, UE endpoints 110 are capable of transmitting and receiving Push-to-Talk (PTT) communications. In some cases, the PTT communications can be transmitted and received over a cellular communications network 120, e.g. using a Push-to-Talk over Cellular (PoC) protocol (e.g., session initiation protocol (SIP), real-time transport protocol (RTP), etc.). In some cases, a PTT app can be installed on each of the UE endpoints 110, wherein the UE endpoints 110 can utilize the PTT app to transmit and receive PTT communications over communications network 120. In some cases, the communication devices 110 can be radios that are capable of communicating over a radio communications network 120, e.g. to transmit and receive PTT communications.

Communications system 100 further comprises a server 130. Server 130 can be configured to manage the broadcasting of communications over communications network 120. Specifically, a user of a given communication device 110 can begin transmitting a communication to other communication devices 110 in communications system 100 only upon being allowed to do so by server 130. It is to be noted that server 130 can be a plurality of servers that are adapted to independently or cooperatively process data.

A user of a given communication device 110 can transmit a communication only after he/she activates the given communication device 110 to transmit the communication and the server 130 permits the transmission of the communication. In some cases, a user of a given communication device 110 can activate the given communication device 110 to transmit a PTT communication by performing one of the following actions: (a) pressing a PTT button that is located on or associated with the given communication device 110, or (b) toggling or otherwise activating a physical PTT switch (e.g., a hand-held switch, a foot switch, etc.) that is located on or associated with the given communication device 110. It is to be noted that any manner in which the user of a given communication device 110 activates the given communication device 110 to transmit a communication is covered by the present disclosure.

Communications system 100 can be associated with one or more groups (not shown), each group of the groups including two or more group members. In some cases, the groups can be PTT groups. The respective group members in each group are users of communication devices 110 in communications system 100. In some cases, the group members in a respective group are entrusted with a specific mission or missions. In some cases, the group members in a respective group are organization members of at least one organization.

Attention is now drawn to FIG. 2, a block diagram schematically illustrating one example of a communication device 110 in communications system 100, in accordance with the presently disclosed subject matter.

In accordance with the presently disclosed subject matter, communication device 110 comprises a network interface 210 that is configured to connect the communication device 110 to communications network 120, through which the communication device 110 can communicate with other communication devices 110 in communications system 100 and with the server 130. The network interface 210 can be configured to enable the communication device 110 to send data and receive data sent thereto through communications network 120.

Communication device 110 can further comprise or be otherwise associated with a data repository 220 (e.g. a database, a storage system, a memory including Read Only Memory—ROM, Random Access Memory—RAM, or any other type of memory, etc.) configured to store data. The data stored can include, for example, one or more of: (a) records associated with personnel in at least one organization, (b) data regarding policies or rules of at least one organization, or (c) historical data of one or more previous communications transmitted or received by the communication device 110. In some cases, data repository 220 can be further configured to enable retrieval and/or update and/or deletion of the stored data. It is to be noted that in some cases, data repository 220 can be distributed.

Communication device 110 further comprises a processing circuitry 230. Processing circuitry 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant communication device 110 resources and for enabling operations related to communication device 110 resources.

Processing circuitry 230 can be configured to include an event information obtaining module 240, and, optionally, an actions performance module 250.

Processing circuitry 230 can be configured, e.g. using event information obtaining module 240, to obtain event information regarding one or more events that are captured at the communication device 110, e.g. by a sensor that is mounted on or situated in the communication device 110. For the purposes of this disclosure, the event information is not based on the following event: activation of the communication device 110 by a user of the communication device 110 to transmit a communication, e.g. by the user activating a PTT button that is situated on or otherwise associated with the communication device 110, as detailed earlier herein, inter alia with reference to FIG. 1.

In some cases, one or more actions can be performed based on the event information, automatically and without involvement of a user of the communication device 110, in response to the user activating the communication device 110 to transmit a communication.

In some cases, processing circuitry 230 can be further configured, e.g. using actions performance module 250, to perform at least one of the one or more actions based on the event information, as detailed further herein, inter alia with reference to FIG. 4. Additionally, or alternatively, in some cases, server 130 can be configured to perform at least one of the one or more actions based on the event information, as detailed further herein, inter alia with reference to FIGS. 3 and 5.

Attention is now drawn to FIG. 3, a block diagram schematically illustrating one example of a server 130 in a communications system 100, in accordance with the presently disclosed subject matter.

In accordance with the presently disclosed subject matter, server 130 can be configured to include a server network interface 310 that is configured to connect the server 130 to a communications network 120, through which the server 130 can communicate with the communication devices 110 in communications system 100. The server network interface 310 can be configured to enable server 130 to send data and receive data sent thereto through communications network 120.

Server 130 can further comprise or be otherwise associated with a server data repository 320 (e.g. a database, a storage system, a memory including Read Only Memory—ROM, Random Access Memory—RAM, or any other type of memory, etc.) configured to store data. The data stored can include, for example, one or more of: (a) records associated with personnel in at least one organization, (b) data regarding policies or rules of at least one organization, or (c) historical data of one or more previous communications transmitted or received by one or more of the communication devices 110. In some cases, server data repository 320 can be further configured to enable retrieval and/or update and/or deletion of the stored data. It is to be noted that in some cases, server data repository 320 can be distributed.

Server 130 further comprises a server processing circuitry 330. Server processing circuitry 330 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant server 130 resources and for enabling operations related to server 130 resources.

Server processing circuitry 330 can be configured to include a server event information obtaining module 340. In some cases, server processing circuitry 330 can be further configured to include a server actions performance module 350. Additionally, or alternatively, in some cases, server processing circuitry 330 can be further configured to include a group prediction module 360 and a group initiation module 370.

Server processing circuitry 330 can be configured, e.g. using server event information obtaining module 340, to obtain event information regarding one or more events that are associated with a given communication device 110 in the communications system 100. In some cases, one or more of the events can be captured by the given communication device 110, e.g. by a sensor that is mounted on or situated in the given communication device 110, as detailed further herein, inter alia with reference to FIGS. 5 and 6. For the purposes of this disclosure, the event information is not based on the following event: activation of the given communication device 110 by a user of the given communication device 110 to transmit a communication, e.g. by the user activating a PTT button that is situated on or otherwise associated with the given communication device 110, as detailed earlier herein, inter alia with reference to FIG. 1.

In some cases, server processing circuitry 330 can be configured, e.g. using server actions performance module 350, to perform at least one action based on the event information that is associated with the given communication device 110, in response to the user of the given communication device 110 activating the given communication device 110 to transmit a communication, as detailed further herein, inter alia with reference to FIG. 5.

Additionally, or alternatively, in some cases, server processing circuitry 330 can be configured, e.g. using group prediction module 360, to predict, based on the event information associated with the given communication device 110, one or more groups (e.g., PTT groups) with which the given communication device 110 is expected to communicate, as detailed further herein, inter alia with reference to FIG. 6.

Furthermore, server processing circuitry 330 can be configured, e.g. using group initiation module 370, to initiate the groups (e.g., PTT groups) with which the given communication device 110 is expected to communicate, based on the prediction, and not responsive to a user of the given communication device 110 activating the given communication device 110 to transmit a communication (e.g., PTT communication) to the groups (e.g., PTT groups), as detailed further herein, inter alia with reference to FIG. 6.

Attention is now drawn to FIG. 4, a flowchart illustrating one example of a sequence of operations performed by a given communication device 110 in a communications system 100 for facilitating a transmission of a given communication by the given communication device 110, in accordance with the presently disclosed subject matter.

In accordance with the presently disclosed subject matter, processing circuitry 230 of the given communication device 110 can be configured, e.g. using event information obtaining module 240, to obtain event information regarding one or more events that are captured at the given communication device 110, the events not including activation of the given communication device 110 by a user of the given communication device 110 to transmit the given communication (block 404). The events can be captured prior to, concurrent with, or following an activation of the given communication device 110 to transmit the given communication.

In some cases, the given communication device 110 can be a User Equipment (UE) endpoint.

In some cases, the user of the given communication device 110 can activate the given communication device 110 to transmit a given PTT communication by activating a PTT button that is situated on or otherwise associated with the given communication device 110. As detailed earlier herein, inter alia with reference to FIG. 1, any manner in which the user of the given communication device 110 activates the given communication device 110 to transmit a communication is covered by the present disclosure.

In some cases, the events that are captured at the given communication device 110 can include one or more of the following: (a) one or more predetermined sounds, e.g. a sound of gunfire, (b) audible content having a first decibel level greater than a predefined second decibel level; (c) a predetermined word or combination of words; or (d) human or other speech uttered at a first rate that is higher than a predefined second rate.

In some cases, processing circuitry 230 can be configured, e.g. using actions performance module 250, to perform one or more actions based on the obtained event information, automatically and without involvement of the user of the given communication device 110, in response to the user activating the given communication device 110 to transmit the given communication (block 408).

In some cases, the actions performed by processing circuitry 230 based on the event information can include selecting the groups (e.g., PTT groups) to which to transmit the given communication, each group of the groups including the user of the given communication device 110 and one or more other users of a corresponding one or more other communication devices 110 that communicate over communications network 120. In this manner, the user of the given communication device 110 can transmit the given communication without selecting the groups to which to transmit the given communication, thereby reducing an amount of time required for the user to transmit the given communication, in response to the event information. In some cases, the given communication can be a video communication, a voice communication, or a text communication.

In some cases, processing circuitry 230 can be further configured to obtain additional information, different than the event information, and wherein at least one of the actions can be performed also based on the additional information.

In some cases, at least some of the additional information can be obtained from one or more external sources, including, inter alia, server 130. Additionally, or alternatively, in some cases, at least some of the additional information can be stored in data repository 220 of the given communication device 110.

In some cases, the given communication device 110 and the other communication devices 110 in the communications system 100 that receive the given communication that is transmitted by the given communication device 110 can be used by organizational members of at least one organization. In some such cases, the additional information can include one or more of: (a) records associated with personnel in the at least one organization, or (b) data regarding policies or rules of the at least one organization.

For example, the additional information can inform, for each of the groups that are to receive the given communication, group members of the respective group that are on-duty and group members of the respective group that are off-duty. In some such cases, for example, processing circuitry 230 can be configured, e.g. using actions performance module 250, to select only the group members that are on-duty to receive the given communication.

In some cases, the additional information can be a reading of a speed at which the given communication device 110 is displaced prior or concurrently to the activation of the given communication device 110 to transmit the given communication, wherein a speed of displacement of the given communication device 110 that is greater than a predetermined threshold speed may be indicative of an occurrence of an emergency situation. For example, processing circuitry 230 can be configured to perform an action (e.g., select the groups to receive the given communication) based on the occurrence of an event or a group of events that are captured at the given communication device 110 and based on the speed at which the given communication device 110 is displaced.

In some cases, the additional information can be a location of the given communication device 110. For example, if the user of the given communication device 110 is an airplane technician who is present in the vicinity of a specific aircraft when activating the given communication device 110 to transmit the given communication, processing circuitry 230 can be configured, for example, to select the airplane technician's group that maintains the specific aircraft to receive the given communication, in response to one or more events that are captured at the given communication device 110. On the other hand, if the airplane technician activates the given communication device 110 while in his office, processing circuitry 230 can be configured, for example, to select the airplane technician's team manager to receive the given communication, in response to the one or more events.

In some cases, the additional information can be historical data of one or more previous communications transmitted or received by the given communication device 110. For example, if the user of the given communication device 110 selects a specific group with which to communicate each weekday morning at 9 AM, processing circuitry 230 can be configured, upon the user activating the given communication device 110 on a weekday morning at 9 AM, to automatically select the specific group, in response to one or more events that are captured at the given communication device 110. As a consequence thereof, the user is saved the time required to select the specific group (he/she can simply activate the given communication device 110 without first selecting the specific group).

Attention is now drawn to FIG. 5, a flowchart illustrating one example of a sequence of operations performed by a server 130 in a communications system 100 for facilitating a transmission of a given communication by a given communication device 110 in the communications system 100, in accordance with the presently disclosed subject matter.

In accordance with the presently disclosed subject matter, server processing circuitry 330 of a server 130 can be configured, e.g. using server event information obtaining module 340, to obtain event information regarding one or more events that are captured at the given communication device 110, the events not including activation of the given communication device 110 by a user of the given communication device 110 to transmit the given communication (block 504). The events can be captured prior to, concurrent with, or following an activation of the given communication device 110 to transmit the given communication.

In some cases, the given communication device 110 can be a User Equipment (UE) endpoint.

In some cases, the user of the given communication device 110 can activate the given communication device 110 to transmit a given PTT communication by activating a PTT button that is situated on or otherwise associated with the given communication device 110. As detailed earlier herein, inter alia with reference to FIG. 1, any manner in which the user of the given communication device 110 activates the given communication device 110 to transmit a communication is covered by the present disclosure.

In some cases, the events that are captured at the given communication device 110 can include one or more of the following: (a) one or more predetermined sounds, e.g. a sound of gunfire, (b) audible content having a first decibel level greater than a predefined second decibel level; (c) a predetermined word or combination of words; or (d) human or other speech uttered at a first rate that is higher than a predefined second rate.

In some cases, server processing circuitry 330 can be configured, e.g. using server actions performance module 350, to automatically perform one or more actions based on the obtained event information, in response to the user activating the given communication device 110 to transmit the given communication (block 508).

In some cases, the actions performed by server processing circuitry 330 based on the event information can include selecting the groups to which to transmit the given communication. In this manner, the user of the given communication device 110 can transmit the given communication without selecting the groups to which to transmit the given communication, thereby reducing an amount of time required for the user to transmit the given communication, in response to the event information. In some cases, the given communication can be a video communication, a voice communication, or a text communication.

Additionally, or alternatively, in some cases, the actions performed by server processing circuitry 330 based on the event information can include bursting into at least one of the groups that has been selected, e.g. by server processing circuitry 330, as detailed in the previous paragraph, or by processing circuitry 230 of the given communication device 110, as detailed earlier herein, inter alia with reference to FIG. 4. In this manner, a user of the given communication device 110 can begin transmitting to the group members of the selected groups even if another communication device in at least one of the selected groups was in the process of transmitting a different communication at the time that the given communication device 110 is activated. Server processing circuitry 330 can be configured to perform the bursting by withdrawing the permission that it provided to the another communication device to transmit the different communication. By bursting into at least one of the groups that has been selected, using the server processing circuitry 330, an amount of time required for the user of the given communication device 110 to transmit the given communication can be reduced, in response to the event information.

In some cases, server processing circuitry 330 can be further configured to obtain additional information, different than the event information, and wherein at least one of the actions can be performed also based on the additional information.

In some cases, at least some of the additional information can be obtained from one or more external sources. Additionally, or alternatively, in some cases, at least some of the additional information can be stored in server data repository 320 of the server 130.

In some cases, the given communication device 110 and the other communication devices 110 in the communications system 100 that receive the given communication that is transmitted by the given communication device 110 can be used by organizational members of at least one organization. In some such cases, the additional information can include one or more of: (a) records associated with personnel in the at least one organization, or (b) data regarding policies or rules of the at least one organization.

For example, the additional information can inform, for each of the groups that are to receive the given communication, group members of the respective group that are on-duty and group members of the respective group that are off-duty. In some such cases, server processing circuitry 330 can be configured, e.g. using server actions performance module 350, to select only the group members that are on-duty to receive the given communication.

In some cases, the additional information can be a reading of a speed at which the given communication device 110 is displaced prior or concurrently to the activation of the given communication device 110 to transmit the given communication, wherein a speed of displacement of the given communication device 110 that is greater than a predetermined threshold speed may be indicative of an occurrence of an emergency situation. For example, server processing circuitry 330 can be configured to perform an action (e.g., burst into the groups that are to receive the given communication) based on the occurrence of an event or a group of events that are captured at the given communication device 110 and based on the speed at which the given communication device 110 is displaced.

In some cases, the additional information can be a location of the given communication device 110. For example, if the user of the given communication device 110 is an airplane technician who is present in the vicinity of a specific aircraft when activating the given communication device 110 to transmit the given communication, server processing circuitry 330 can be configured, for example, to select the airplane technician's group that maintains the specific aircraft to receive the given communication, in response to one or more events that are captured at the given communication device 110. On the other hand, if the airplane technician activates the given communication device 110 while in his office, server processing circuitry 330 can be configured, for example, to select the airplane technician's team manager to receive the given communication, in response to the one or more events.

In some cases, the additional information can be historical data of one or more previous communications transmitted or received by the given communication device 110. For example, if the user of the given communication device 110 selects a specific group with which to communicate each weekday morning at 9 AM, server processing circuitry 330 can be configured, upon the user activating the given communication device 110 on a weekday morning at 9 AM, to automatically select the specific group, in response to one or more events that are captured at the given communication device 110. As a consequence thereof, the user is saved the time required to select the specific group (he/she can simply activate the given communication device 110 without first selecting the specific group).

Attention is now drawn to FIG. 6, a flowchart illustrating one example of a sequence of operations performed by a server 130 in a communications system 100 for managing group communications by a given communication device 110 in the communications system 100, in accordance with the presently disclosed subject matter.

In accordance with the presently disclosed subject matter, in some cases, server processing circuitry 330 of server 130 can be configured, e.g. using server event information obtaining module 340, to obtain event information regarding one or more events that are associated with the given communication device 110, the events not including activation of the given communication device 110 by a user of the given communication device 110 to transmit a given communication (block 604). The event information can be captured prior to, concurrent with, or following the activation of the given communication device 110 to transmit the given communication.

In some cases, the events that are associated with the given communication device 110 can include events that are captured at the given communication device 110.

In some cases, the given communication device 110 can be a User Equipment (UE) endpoint.

In some cases, the user of a given communication device 110 can activate the given communication device 110 to transmit a given PTT communication by activating a PTT button that is situated on or otherwise associated with the given communication device 110. As detailed earlier herein, inter alia with reference to FIG. 1, any manner in which the user of the given communication device 110 activates the given communication device 110 to transmit a communication is covered by the present disclosure.

In some cases, the events can include a start of a work shift for a group that includes the user of the given communication device 110. Additionally, or alternatively, in some cases, the events can be captured at the given communication device 110. The captured events can include one or more of the following: (a) one or more predetermined sounds, e.g. a sound of gunfire, (b) audible content having a first decibel level greater than a predefined second decibel level; (c) a predetermined word or combination of words; or (d) human or other speech uttered at a first rate that is higher than a predefined second rate.

In some cases, server processing circuitry 330 can be configured, e.g. using group prediction module 360, to predict, based on the obtained event information, one or more groups in communications system 100 with which given communication device 110 is expected to communicate (block 608). Moreover, upon predicting the groups with which the given communication device 110 is expected to communicate, server processing circuitry 330 can be configured, e.g. using group initiation module 370, to automatically initiate these groups (block 612). As a result, upon a user of the given communication device 110 activating the given communication device 110 to transmit a given communication, the user can begin transmitting the given communication to group members of the predicted groups without further processing by the server 130 to initiate the predicted groups.

For example, if the event is the start of the work shift for a group that includes the user of the given communication device 110, server processing circuitry 330 can be configured, for example, to predict that the given communication device 110 is expected to communicate with the other users in this group. In accordance with the prediction, server processing circuitry 330 can be configured to automatically initiate the group prior to the user of the given communication device 110 activating the given communication device 110 to transmit a given communication to the members of the group.

As an additional example, if the event is the capturing of audible content that is indicative of a given type of emergency, server processing circuitry 330 can be configured, for example, to predict that the given communication device 110 is expected to communicate with group members of the group that handles the given type of emergency, and to automatically initiate this group prior to the user of the given communication device 110 activating the given communication device 110 to transmit the given communication to the group members of the group.

In some cases, server processing circuitry 330 can be configured to obtain additional information, different than the event information, wherein the groups with which the given communication device 110 is expected to communicate can be predicted based on the event information and the additional information.

In some cases, at least some of the additional information can be obtained from one or more external sources. Additionally, or alternatively, in some cases, at least some of the additional information can be stored in server data repository 320 of the server 130.

In some cases, the given communication device 110 and the other communication devices 110 in communications system 100 that receive the given communication that is transmitted by the given communication device 110 can be used by organizational members of at least one organization. In some such cases, the additional information can include one or more of: (a) records associated with personnel in the at least one organization, the records not including work shift information regarding the personnel, or (b) data regarding policies or rules of the at least one organization.

For example, the additional information can inform, for each of the groups that are expected to receive the given communication, group members of the respective group that are on-duty and group members of the respective group that are off-duty. In some such cases, server processing circuitry 330 can be configured, e.g. using group prediction module 360, to predict that only the group members that are on-duty are expected to receive the given communication. Group initiation module 370 can then initiate the respective group such that only the group members that are on-duty will receive the given communication.

In some cases, the additional information can be a location of the given communication device 110. For example, if the user of the given communication device 110 is an airplane technician that is present in the vicinity of a specific aircraft, server processing circuitry 330 can be configured, e.g. using group prediction module 360, to predict that the airplane technician will transmit a given communication to the technician's group that is maintaining (e.g., fixing) the specific aircraft, in response to one or more events that are associated with the given communication device 110. Server processing circuitry 330 can then be configured, e.g. using group initiation module 370, to initiate the technician's group that is maintaining the specific aircraft.

On the other hand, if the airplane technician is in his/her office, server processing circuitry 330 can be configured, e.g. using group prediction module 360, to predict that the airplane technician will transmit the given communication to the airplane technician's team manager, in response to one or more events that are associated with the given communication device 110. Server processing circuitry 330 can then be configured, e.g. using group initiation module 370, to initiate the technician's team manager for receiving communications from the airplane technician.

In some cases, the additional information can be historical data of one or more previous communications transmitted or received by the given communication device 110. For example, if a user of a given communication device 110 selects a specific group with which to communicate each weekday morning at 9 AM, server processing circuitry 330 can be configured, e.g. using group prediction module 360, to predict, prior to 9 AM on a weekday morning, and in response to one or more events that are associated with the given communication device 110, that the user will transmit the given communication to the specific group at 9 AM. Server processing circuitry 330 can then be configured, e.g. using group initiation module 370, to initiate the specific group prior to the activation of the given communication device 110 by the user of the given communication device 110 to transmit the given communication, e.g. prior to 9 AM on the weekday morning.

It is to be noted that, with reference to FIGS. 4 to 6, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagrams are described also with reference to the system elements that realize them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A communications system for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the communications system comprising processing circuitry configured to:
    obtain event information regarding one or more events that are captured at the given communication device by a sensor, the events not including activation of the given communication device by the user of the given communication device to transmit the given communication; and
    in response to the user activating the given communication device to transmit the given communication, and based on the event information, automatically select the groups to which to transmit the given communication without further involvement of the user of the given communication device;
    wherein the events that are captured at the given communication device include one or more of the following: (a) a sound of gunfire; (b) audible content having a first decibel level greater than a predefined second decibel level; (c) a predetermined word or combination of words; or (d) human or other speech uttered at a first rate that is higher than a predefined second rate.

2. The communications system of claim 1, wherein the processing circuitry is further configured to:
    in response to the user activating the given communication device to transmit the given communication, and based on the event information, automatically burst into at least one of the groups.

3. The communications system of claim 1, wherein the given communication device and the other communication devices are User Equipment (UE) endpoints.

4. The communications system of claim 1, wherein the groups are Push to Talk (PTT) groups, and wherein the user of the given communication device activates the given communication device by activating a PTT button that is situated on or otherwise associated with the given communication device.

5. The communications system of claim 1, wherein the processing circuitry is further configured to obtain additional information, different than the event information, and wherein the groups are selected also based on the additional information.

6. The communications system of claim 5, wherein the given communication device and the other communication devices are used by organizational members of at least one organization, and the additional information includes one or more of: (a) records associated with personnel in the at least one organization, or (b) data regarding policies or rules of the at least one organization.

7. The communications system of claim 5, wherein the additional information is a reading of a speed at which the given communication device is displaced prior or concurrently to the activation of the given communication device to transmit the given communication.

8. The communications system of claim 5, wherein the additional information is a location of the given communication device.

9. The communications system of claim 5, wherein the additional information is historical data of one or more previous communications transmitted or received by the given communication device.

10. A method for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the method comprising:
    obtaining event information regarding one or more events that are captured at the given communication device by a sensor, the events not including activation of the given communication device by the user of the given communication device to transmit the given communication; and
    in response to the user activating the given communication device to transmit the given communication, and based on the event information, automatically selecting the groups to which to transmit the given communication without further involvement of the user of the given communication device;
    wherein the events that are captured at the given communication device include one or more of the following: (a) a sound of gunfire; (b) audible content having a first decibel level greater than a predefined second decibel level; (c) a predetermined word or combination of words; or (d) human or other speech uttered at a first rate that is higher than a predefined second rate.

11. The method of claim 10, wherein, in response to the user activating the given communication device to transmit the given communication, and based on the event information, the method further comprises:
    automatically bursting into at least one of the groups.

12. The method of claim 10, wherein the given communication device and the other communication devices are User Equipment (UE) endpoints.

13. The method of claim 10, wherein the groups are Push to Talk (PTT) groups, and wherein the user of the given communication device activates the given communication device by activating a PTT button that is situated on or otherwise associated with the given communication device.

14. The method of claim 10, further comprising:
obtaining additional information, different than the event information, wherein the groups are selected also based on the additional information.

15. The method of claim 14, wherein the given communication device and the other communication devices are used by organizational members of at least one organization, and the additional information includes one or more of: (a) records associated with personnel in the at least one organization, or (b) data regarding policies or rules of the at least one organization.

16. The method of claim 14, wherein the additional information is a reading of a speed at which the given communication device is displaced prior or concurrently to the activation of the given communication device to transmit the given communication.

17. The method of claim 14, wherein the additional information is a location of the given communication device.

18. The method of claim 14, wherein the additional information is historical data of one or more previous communications transmitted or received by the given communication device.

19. A non-transitory computer readable storage medium having computer readable program code embodied therewith, the computer readable program code, executable by a processing circuitry of a computer to perform a method for managing a transmission of a given communication by a given communication device to one or more group members of one or more groups over a communications network, wherein respective group members of each group of the groups include a user of the given communication device and one or more other users of a corresponding one or more other communication devices that communicate over the communications network, the method comprising:
obtaining event information regarding one or more events that are captured at the given communication device by a sensor, the events not including activation of the given communication device by the user of the given communication device to transmit the given communication; and
in response to the user activating the given communication device to transmit the given communication, and based on the event information, automatically selecting the groups to which to transmit the given communication without further involvement of the user of the given communication device;
wherein the events that are captured at the given communication device include one or more of the following: (a) a sound of gunfire; (b) audible content having a first decibel level greater than a predefined second decibel level; (c) a predetermined word or combination of words; or (d) human or other speech uttered at a first rate that is higher than a predefined second rate.

* * * * *